Oct. 16, 1951     F. LE B. LORD     2,571,145
BATTERY TERMINAL CONNECTOR
Filed Jan. 17, 1947
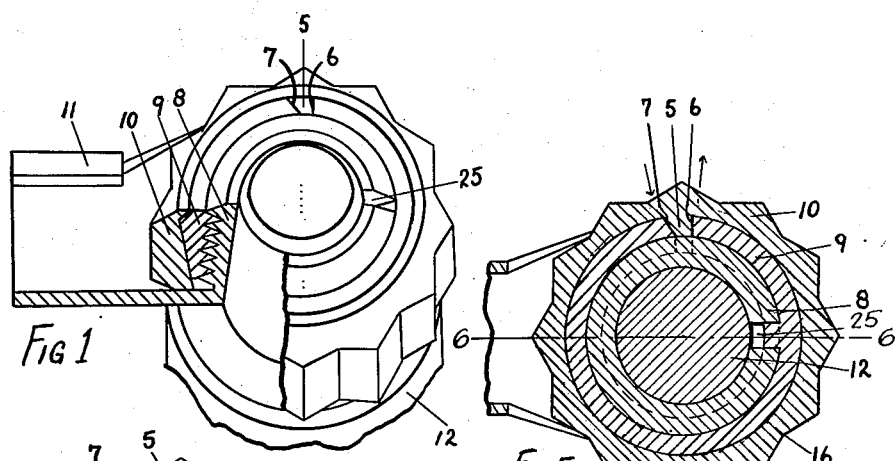
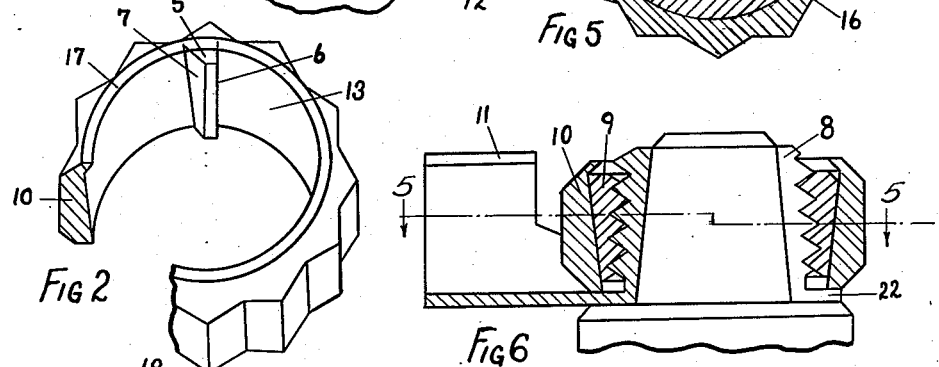
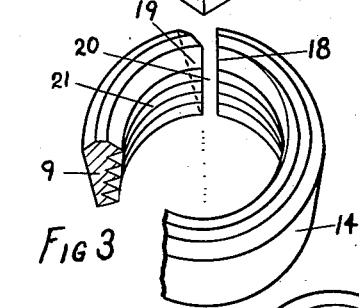
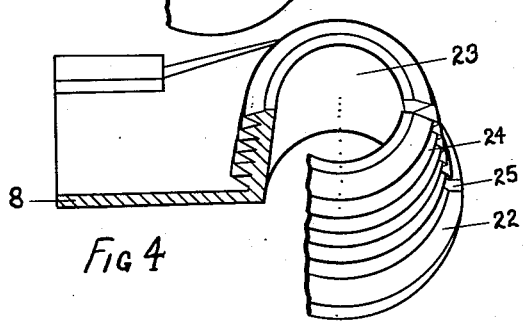
INVENTOR.
Francis LeBarron Lord
BY
Edward G. Roe
Attorney Patented Oct. 16, 1951

2,571,145

UNITED STATES PATENT OFFICE 2,571,145

BATTERY TERMINAL CONNECTOR

Francis Le Barron Lord, Orange, N. J., assignor of one-fourth to Violet Clara Grew, Orange, N. J., and three-eighths to Eloise T. Roe, Pleasantville, N. Y.

Application January 17, 1947, Serial No. 722,508

2 Claims. (Cl. 173—259)

This invention is a low-loss, non-corrosive, vibration proof, battery and electrical connector assembly, that can be rigidly made of soft metals that are non-corrosive and have the desired electrical value.

The helix angle of the present type of thread acts as an extruder or meat chopper, shearing or stripping thread in the direction of strain.

In my invention the pressure is transferred to the right angle of strain through taper relation of parts.

My invention contacts full thread area—that is, 100% contact at right angles to direction of screw, thus creating full support of all parts, thereby eliminating possible stripping of threads. The present threads have 37% contact at Number 5 fit in the direction of screw.

Among other features is the self-locking, obtained by key relation; the abrupt face to allow full tightening; the beveled to prevent loosening.

In the drawing:

Fig. 1 is a cut-away perspective view of entire connector.

Fig. 2 is a cut-away perspective view of compressor.

Fig. 3 is a cut-away perspective view of contractor.

Fig. 4 is a cut-away perspective view of connector element.

Fig. 5 is a cross-sectional view taken along line 5—5 of Fig. 6.

Fig. 6 is a cross-sectional view taken along line 6—6 of Fig. 5.

The assembly comprises three principal parts, a connector 8, a contractor 9 and a compressor 10.

Referring to Fig. 2 compressor 10 has key 5 formed as a unitary part of and extending from the inner circumferential bore 13, said key having abrupt face 6 and beveled face 7, with inner face 13 being tapered small to base. The rim of face 13 is provided with flange 17.

Cooperating with compressor 10 is contractor 9, best shown in Fig. 3, with slit 20 to mate key 5, said slit provided with abrupt face 18 and beveled face 19. Taper thread 21 is formed on the inner bore thereof, with said taper thread being large to base. The outer surface 14 of contractor 9 is tapered to mate bore 13.

Connector 8 has wire receptor 11 and is either formed or molded with axial slit 25 to permit it to compress on battery post 12. Bore 23 of said connector is tapered large to bottom to mate battery post 12. The threaded outer portion 24 of said connector is tapered large to base to mate contractor 9, with flange 22 provided as a stop for compressor 10—see Fig. 6.

To assemble the parts contractor 9 is placed within compressor 10, an angular closing die being employed to crimp and form flange 17. Members 9 and 10 are then screwed on connector 8. When connecting the assembly to a battery post 12—see Fig. 6—it is merely necessary to turn compressor 10 in a clockwise direction.

In using the invention, forward or clockwise movement of the compressor 10 and contractor 9 on the connector 8 will cause the surface 23 of the connector 8 to tighten around the post 12. Counterclockwise movement, or loosening, is resisted by the beveled face 7 of the key 5 creating a wedge effect which causes the contractor 9 to seize the connecter 8 adjacent the slit 20.

When contractor 9 advances on connector 8 the angle transfers the force from the axial direction to the right angle direction. The angles are 4 to 1, four in number, while the side pressure would be equal to the strain, offsetting any damage to threads.

If the angles were eight to 1, four in number, the side pressure would be twice that of the strain.

My invention provides a low-loss, non-corrosive, vibration proof and rapidly assembled battery and electrical connector assembly which can be manufactured of any soft material that is non-corrosive and has the proper electrical values.

I claim:

1. A battery connecter assembly including: a connecter having a base portion, one end of which is provided with a fixed electrical connection, the other end having an upstanding, centrally taper-bored portion, tapered large to bottom and spaced away from the edge of the base to form a flange, said upstanding portion axially slit, externally taper threaded large to bottom, and adapted to receive a battery terminal post; a contracter provided with an axial slit, internally taper threaded large to bottom to mate the threads of the last-mentioned connecter and externally tapered small to bottom, one face of the slit formed with an abrupt face, the other face formed with a beveled face; a compressor internally taper bored small to bottom, to cooperatively receive the contracter, the upper rim of the bore provided with a flange, said bore having a key formed thereon, with one beveled and one abrupt face cooperating with the beveled and abrupt face of the axial slit, whereby upon rotation of the compressor in a clockwise direction the abrupt face of the compressor will press against the abrupt face of the contracter to cause it to advance on the externally threaded connector, to compress the latter upon a battery terminal post received within the connector.

2. A battery and electrical connector assembly including: a connector having a base portion, one end of which is formed with an upstanding, centrally taper-bored portion, tapered large to bottom and spaced away from the edge of the base to form a flange, said upstanding portion axially slit, externally taper threaded large to bottom and adapted to receive a tapered electrical terminal post; a contracter provided with an axial slit, internally taper threaded large to bottom to mate the threads of the last mentioned connecter and exernally tapered small to bottom, one face of the slit formed with an abrupt face, the other face formed with a beveled face; a compressor internally taper bored small to bottom to cooperatively receive the contracter, the upper rim of the bore provided with laterally extending flange adapted to contain the contracter, the said bore having a key formed thereon, with one beveled and one abrupt face cooperating with the beveled and abrupt face of the axial slit to cause a seizure on the connecter if the compressor is caused to move in a counter-clockwise direction by vibration or other undesired movement after the members are in assembled relationship in tightened position on an electrical terminal post.

FRANCIS LE BARRON LORD.

REFERENCES CITED

The following references are of record in the file of this patent:

UNITED STATES PATENTS

| Number | Name | Date |
|---|---|---|
| 622,307 | Wilson | Apr. 4, 1899 |
| 1,675,991 | Poland | July 3, 1928 |
| 1,794,757 | Cutler | Mar. 3, 1931 |
| 1,859,545 | Wallenberg et al. | May 24, 1932 |
| 2,093,079 | Hixon | Sept. 14, 1937 |
| 2,388,270 | Lord | Nov. 6, 1945 |
| 2,443,466 | Lord | June 15, 1948 |